United States Patent
Johnson et al.

(10) Patent No.: US 11,895,990 B1
(45) Date of Patent: Feb. 13, 2024

(54) AUTOMATED FISH-FEEDING DEVICE

(71) Applicants: Eddie Johnson, Anderson Township, OH (US); Monique Johnson, Anderson Township, OH (US)

(72) Inventors: Eddie Johnson, Anderson Township, OH (US); Monique Johnson, Anderson Township, OH (US)

( * ) Notice: Subject to any disclaimer, the term of this patent is extended or adjusted under 35 U.S.C. 154(b) by 0 days.

(21) Appl. No.: 17/729,108

(22) Filed: Apr. 26, 2022

(51) Int. Cl.
*A01K 61/85* (2017.01)

(52) U.S. Cl.
CPC .................................... *A01K 61/85* (2017.01)

(58) Field of Classification Search
CPC ...................................................... A01K 61/85
See application file for complete search history.

(56) References Cited

U.S. PATENT DOCUMENTS

| | | | |
|---|---|---|---|
| 5,138,978 A | 8/1992 | Reid | |
| 5,199,381 A | 4/1993 | Masopust | |
| 5,709,166 A * | 1/1998 | Evans | A01K 5/02 119/51.11 |
| 6,009,835 A | 1/2000 | Boschert | |
| 6,779,485 B2 | 8/2004 | Bresolin | |
| 6,938,652 B1 * | 9/2005 | Harmon, Jr. | A01K 61/85 141/98 |
| 8,695,534 B2 * | 4/2014 | Banuelos | A01K 5/0291 119/51.11 |
| 10,716,297 B2 | 7/2020 | Johnson | |
| 2009/0255474 A1 * | 10/2009 | Gleesing | A01K 61/85 119/51.11 |
| 2012/0227670 A1 | 9/2012 | Hudson | |
| 2014/0033990 A1 * | 2/2014 | Brown | A01K 15/021 119/719 |
| 2015/0208619 A1 * | 7/2015 | Noble | A01K 61/85 119/51.04 |
| 2015/0342158 A1 * | 12/2015 | Daniels, Jr. | A01K 61/85 119/51.04 |
| 2017/0099812 A1 | 4/2017 | Chang | |
| 2022/0240491 A1 * | 8/2022 | Hunter | A01K 61/85 |

FOREIGN PATENT DOCUMENTS

CA    2029610    5/1992

* cited by examiner

*Primary Examiner* — Monica L Perry
*Assistant Examiner* — Brittany A Lowery
(74) *Attorney, Agent, or Firm* — Kyle A. Fletcher, Esq.

(57) ABSTRACT

The automated fish-feeding device comprises a feeder mechanism and a controller. The automated fish-feeding device may be adapted to dispense fish food to fish in an aquarium in the absence of a user. As a non-limiting example, the automated fish-feeding device may dispense the fish food while the user is on vacation. The feeder mechanism may dispense a plurality of seaweed sheets, frozen fish food cubes, or both in accordance with a predetermined schedule. The feeder mechanism may comprise a refrigeration unit for chilling the frozen fish food cubes and a pump to thaw an individual frozen fish food cube using aquarium water before dispensing the individual frozen fish food cube. The automated fish-feeding device may be packaged in an aquarium-mount enclosure that hangs on the side of the aquarium.

13 Claims, 6 Drawing Sheets

AUTOMATED FISH-FEEDING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of aquarium accessories, more specifically, an automated fish-feeding device.

SUMMARY OF INVENTION

The automated fish-feeding device comprises a feeder mechanism and a controller. The automated fish-feeding device may be adapted to dispense fish food to fish in an aquarium in the absence of a user. As a non-limiting example, the automated fish-feeding device may dispense the fish food while the user is on vacation. The feeder mechanism may dispense a plurality of seaweed sheets, frozen fish food cubes, or any combination in accordance with a predetermined schedule. The feeder mechanism may comprise a refrigeration unit for chilling the frozen fish food cubes and a pump to thaw an individual frozen fish food cube using aquarium water before dispensing the individual frozen fish food cube. The automated fish-feeding device may be packaged in an aquarium-mount enclosure that hangs on the side of the aquarium.

An object of the invention is to dispense fish food into an aquarium according to a predetermined schedule, even in the absence of a user.

Another object of the invention is to dispense a plurality of seaweed sheets, one at a time.

A further object of the invention is to dispense a plurality of frozen fish food cubes, one at a time.

Yet another object of the invention is to refrigerate the frozen fish food cubes to prevent thawing and to thaw an individual fish food cube using aquarium water prior to dispensing into the aquarium.

These together with additional objects, features and advantages of the automated fish-feeding device will be readily apparent to those of ordinary skill in the art upon reading the following detailed description of the presently preferred, but nonetheless illustrative, embodiments when taken in conjunction with the accompanying drawings.

In this respect, before explaining the current embodiments of the automated fish-feeding device in detail, it is to be understood that the automated fish-feeding device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated fish-feeding device.

It is therefore important that the claims be regarded as including such equivalent construction insofar as they do not depart from the spirit and scope of the automated fish-feeding device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
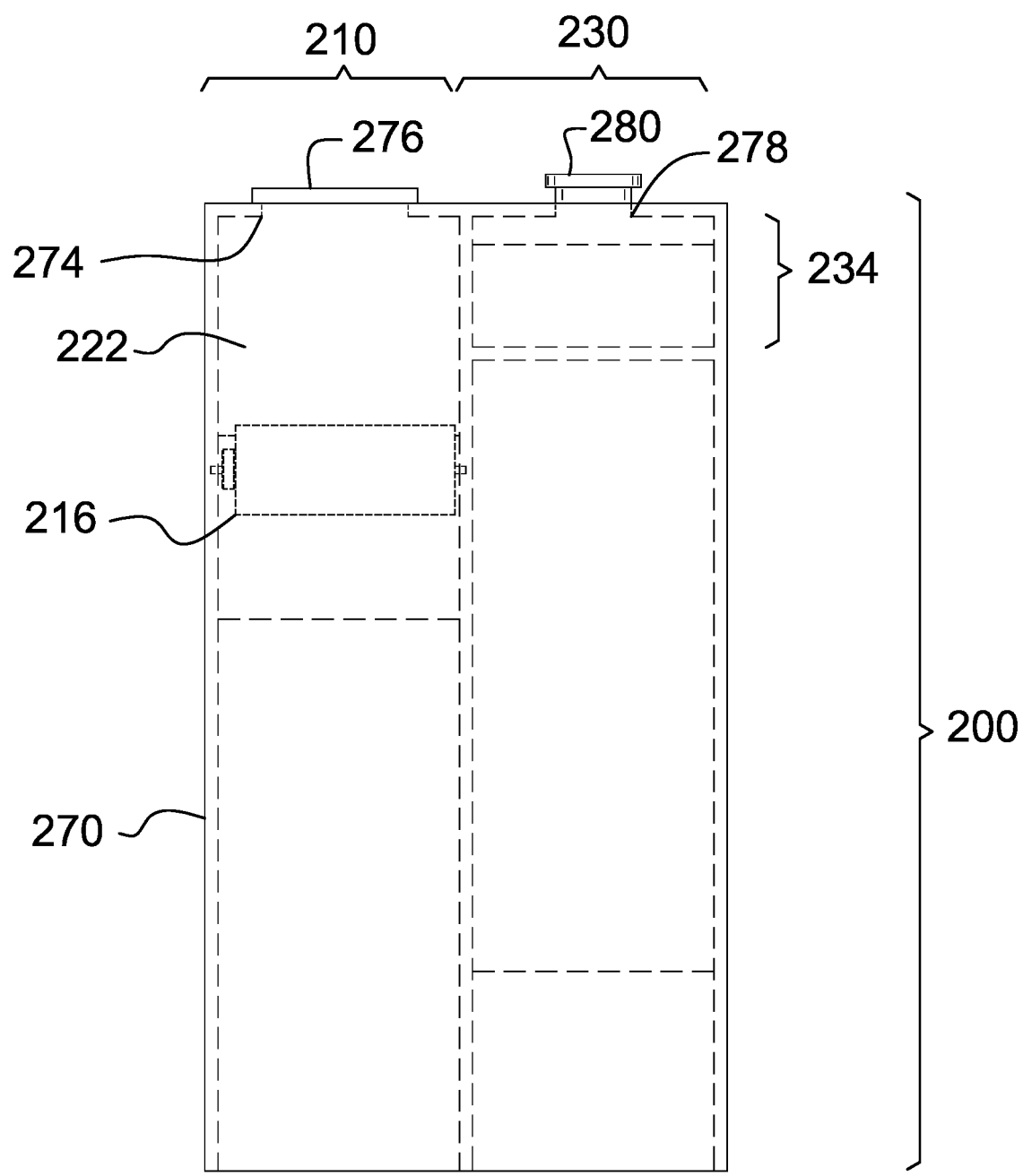
FIG. 1 is a front view of an embodiment of the disclosure.
Figure 2:
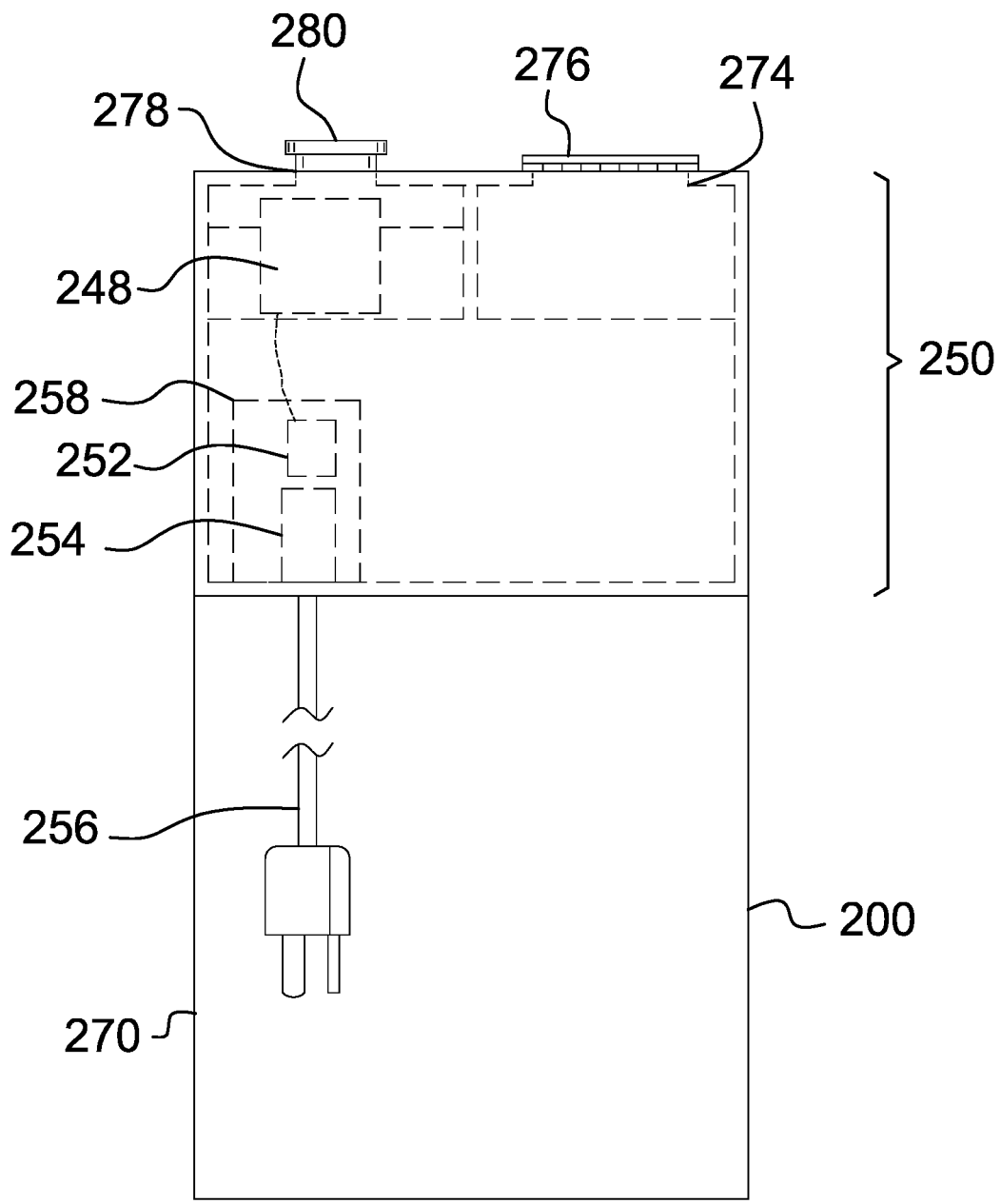
FIG. 2 is a rear view of an embodiment of the disclosure.
Figure 3:
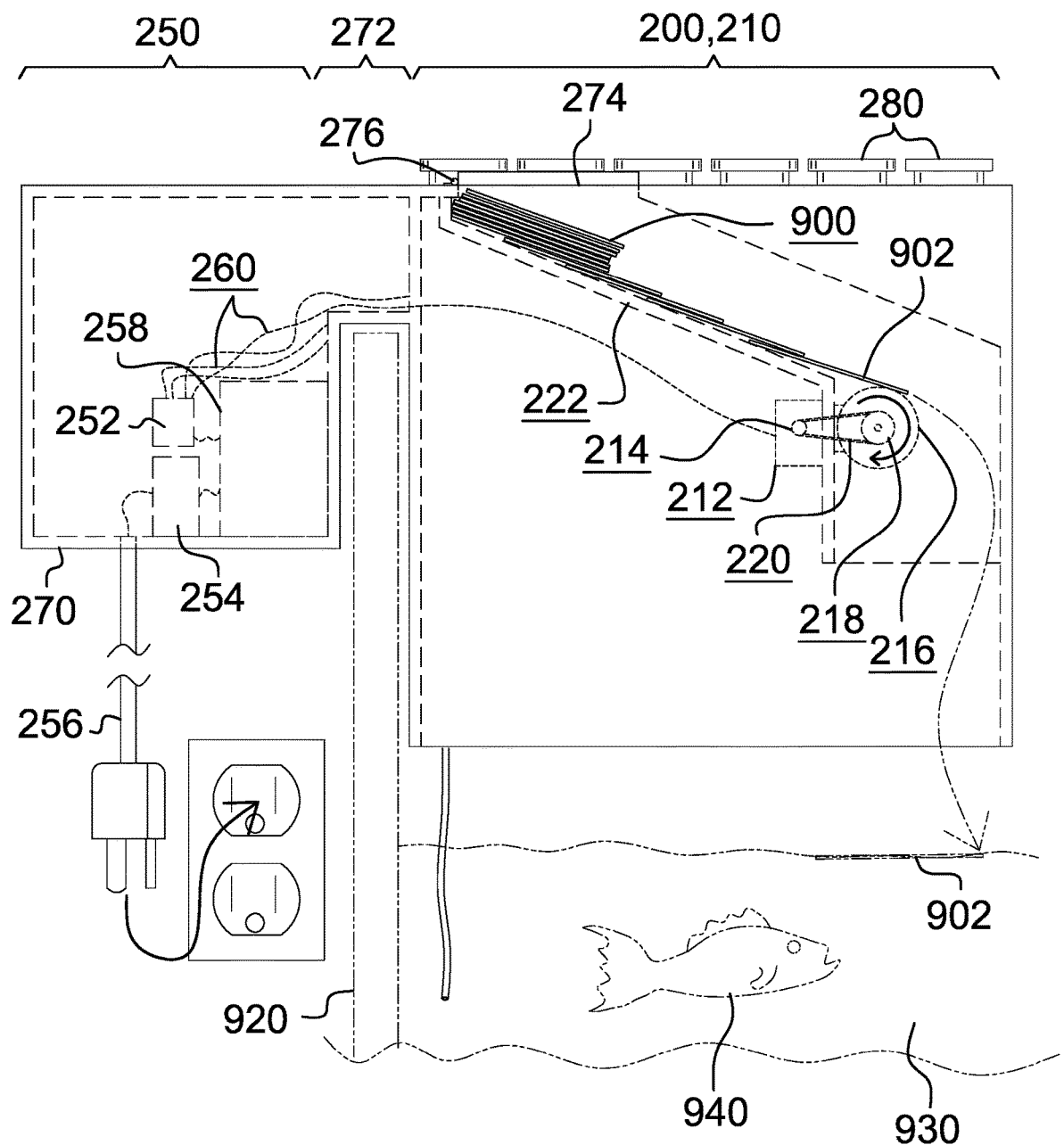
FIG. 3 is a left side view of an embodiment of the disclosure.
Figure 4:
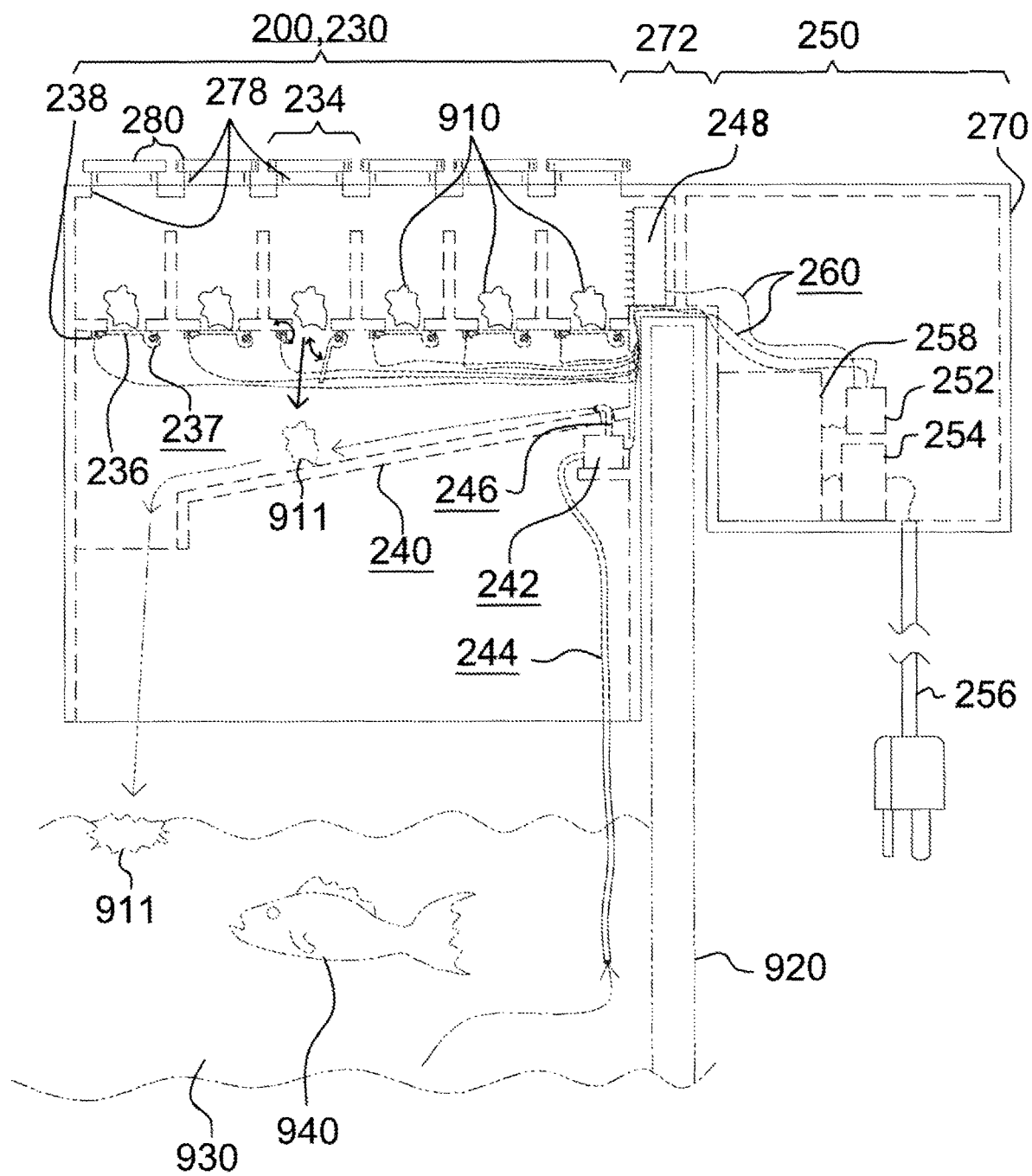
FIG. 4 is a right side view of an embodiment of the disclosure.
Figure 5:
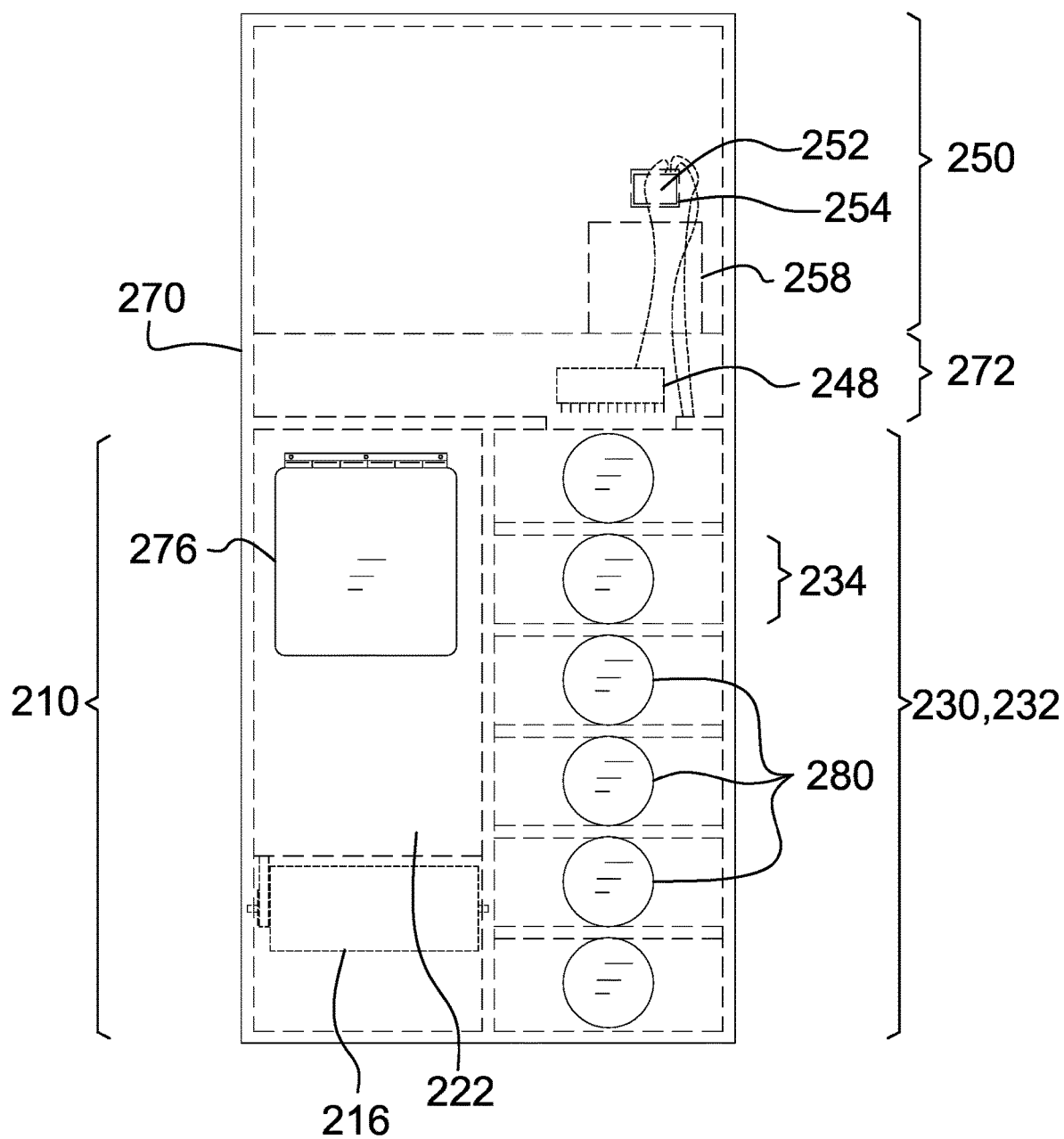
FIG. 5 is a top view of an embodiment of the disclosure.
Figure 6:
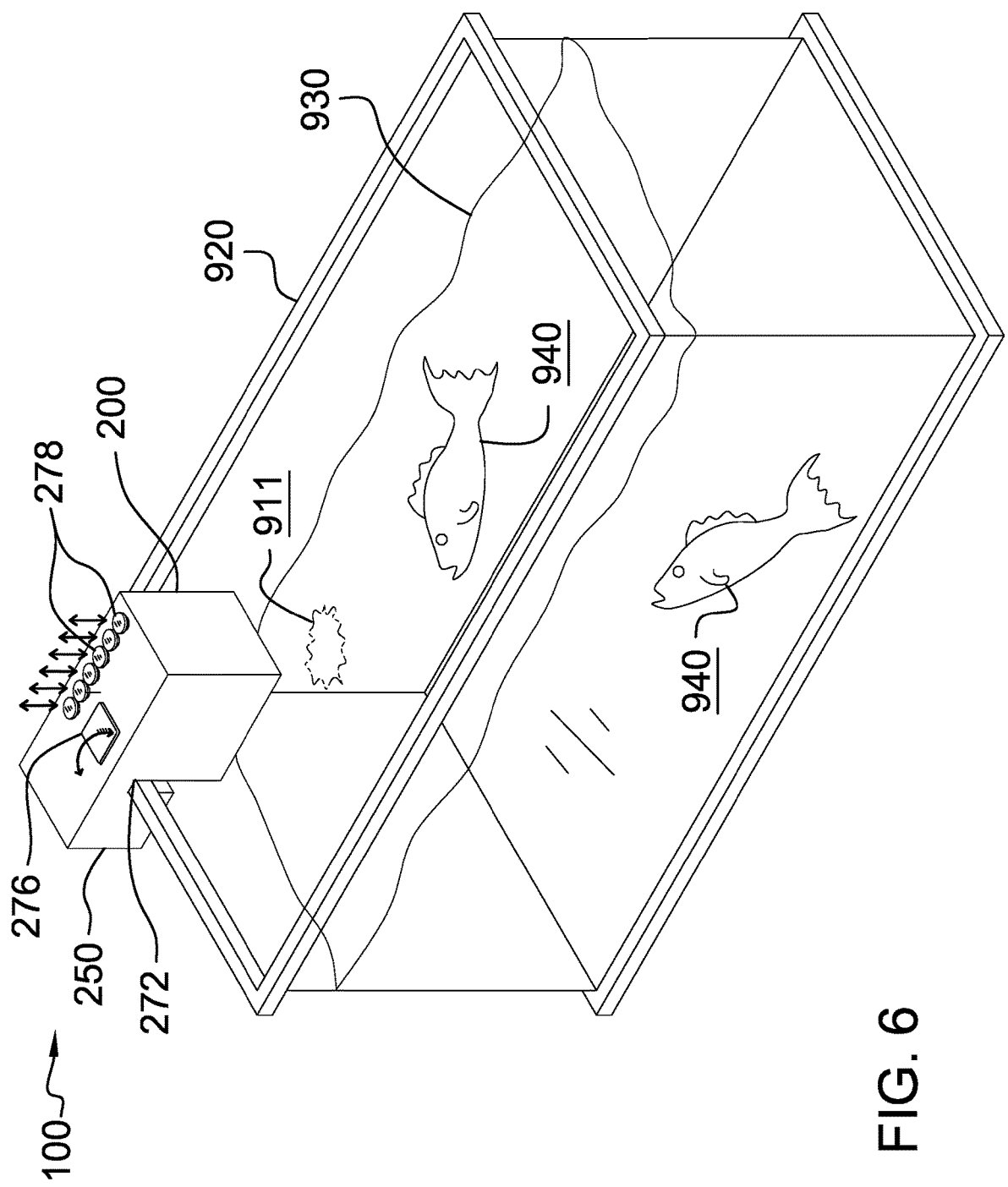
FIG. 6 is an in-use view of an embodiment of the disclosure.

Detailed reference will now be made to a first potential embodiment of the disclosure, which is illustrated in FIGS. 1 through 6.

The automated fish-feeding device 100 (hereinafter invention) comprises a feeder mechanism 200 and a controller 250. The invention 100 may be adapted to dispense fish food to fish 940 in an aquarium 920 in the absence of a user. As a non-limiting example, the invention 100 may dispense the fish food while the user is on vacation. The feeder mechanism 200 may dispense a plurality of seaweed sheets 900, frozen fish food cubes 910, or all in accordance with a predetermined schedule. The feeder mechanism 200 may comprise a refrigeration unit 248 for chilling the frozen fish food cubes 910 and a pump 242 to thaw an individual frozen fish food cube 911 using aquarium water 930 before dispensing the individual frozen fish food cube 911. The invention 100 may be packaged in an aquarium top, or an aquarium-mount enclosure 270 that hangs on the side of the aquarium 920.

The feeder mechanism 200 may comprise a sheet feeder 210 and a frozen cube feeder 230. The feeder mechanism 200 may be suspended above the aquarium water 930. The sheet feeder 210 and the frozen cube feeder 230 may be side-by-side within the feeder mechanism 200.

The sheet feeder 210 may store a supply comprising the plurality of seaweed sheets 900. An individual seaweed sheet 902 may be drawn from the bottom of the supply by a roller 216 when the roller 216 is activated. The roller 216 may be activated by energizing a motor 212.

The motor 212 may be coupled to a motor pulley 214 and the roller 216 may be coupled to a roller pulley 218. A belt 220 may couple the motor pulley 214 to the roller pulley 218 such that energizing the motor 212 may cause rotation of the roller 216.

The motor 212 may convert electrical energy into mechanical energy. The motor 212 may cause rotation of the motor pulley 214 when the electrical energy is applied to the motor 212. The electrical energy applied to the motor 212 may be controlled by the controller 250.

The sheet feeder 210 may comprise a sheet ramp 222 which may direct the plurality of seaweed sheets 900 to the roller 216.

The frozen cube feeder 230 may dispense the frozen fish food cubes 910 one at a time. As non-limiting examples, the frozen fish food cubes 910 may be frozen brine shrimp cubes, frozen bloodworm cubes, frozen water flea cubes, or any combination thereof.

The frozen fish food cubes 910 may be stored in a plurality of compartments 232 before being dispensed. An individual compartment 234 selected from the plurality of compartments 232 may store one of the individual frozen fish food cubes 911.

The individual compartment 234 may comprise a trap door 236 at the bottom of the individual compartment 234. The trap door 236 may be held closed by a door latch 238. The door latch 238 may be electromechanical and may be energized by the controller 250 to release the trap door 236. Upon being released by the door latch 238, a spring within a hinge 237 of the trap door 236 may force the trap door 236 to open, releasing the individual frozen fish food cube 911 from the individual compartment 234.

The individual frozen fish food cube 911 released from the individual compartment 234 may land on a cube ramp 240. The controller 250 may pump the aquarium water 930 onto the cube ramp 240 to thaw the individual frozen fish food cube 911. Once thawed, the controller 250 may increase the flow of the aquarium water 930 to move the individual frozen fish food cube 911 down the cube ramp 240 and into the aquarium 920.

The pump 242 may move the aquarium water 930 from a suction hose 244 to a water outlet tube 246. The pump 242 may be electromechanical and may comprise an internal motor that may be energized by the application of an electrical potential to the pump 242. As non-limiting examples, the pump 242 may move the aquarium water 930 by applying rotary motion, reciprocating motion, linear motion, or a combination thereof to one or more gears, screws, pistons, shuttle blocks, vanes, diaphragms, plungers, chains, ropes, impellers, or combinations thereof. The electrical potential may be applied to the motor 212 by the controller 250. The suction hose 244 may extend down from the pump 242 into the aquarium water 930. The water outlet tube 246 may be positioned to dispense the aquarium water 930 onto the cube ramp 240.

The frozen cube feeder 230 may comprise the refrigeration unit 248 to prevent the frozen fish food cubes 910 from thawing prior to being dispensed onto the cube ramp 240. The refrigeration unit 248 may provide cooled air into the plurality of compartments 232. All or part of the aquarium-mount enclosure 270 may be thermally insulated to increases the effectiveness of the refrigeration unit 248.

The controller 250 may be suspended adjacent to the feeder mechanism 200 outside of the aquarium 920. The controller 250 may monitor and control the operation of the sheet feeder 210, the frozen cube feeder 230, and the refrigeration unit 248. The controller 250 may comprise a microprocessor 252, a power conditioning circuit 254, and a battery 258.

The microprocessor 252 may be a computer processor that incorporates the functions of a central processing unit in the form of one or more integrated circuits. The microprocessor 252 may monitor the sheet feeder 210, the frozen cube feeder 230, and the refrigeration unit 248 by acquiring binary data through one or more input ports, may process the binary data according to instructions stored in memory contained within the microprocessor 252, and may alter the state of one or more output signals to control the sheet feeder 210, the frozen cube feeder 230, and the refrigeration unit 248. As non-limiting examples, the microprocessor 252 may activate the sheet feeder 210 to dispense the individual seaweed sheet 902 and/or may activate the frozen cube feeder 230 to dispense and thaw the individual frozen fish food cube 911 according to the predetermined schedule stored within the memory of the microprocessor 252. As a further non-limiting example, the microprocessor 252 may establish an operating temperature for the refrigeration unit 248 to maintain within the plurality of compartments 232.

The power conditioning circuit 254 may accept AC power supplied via an AC power cord 256 and may reduce, rectify, filter, or otherwise electrically alter the AC power to produce a DC voltage for charging the battery 258. The battery 258 may assure that the sheet feeder 210, the frozen cube feeder 230, and the refrigeration unit 248 remain operable during a power failure.

The battery 258 may comprise one or more energy-storage devices. The battery 258 may be a source of electrical energy to operate the microprocessor 252, the motor 212, the refrigeration unit 248, the door latches 238. The battery 258 may be rechargeable and/or replaceable.

The aquarium-mount enclosure 270 may house the feeder mechanism 200 and the controller 250. A bridge 272 located between the feeder mechanism 200 and the controller 250 may be operable to rest on the side of the aquarium 920 such that the invention 100 may be mounted on the aquarium 920. Wiring 260 between the controller 250 and the feeder mechanism 200 may pass through the bridge 272. The aquarium-mount enclosure 270 may comprise a sheet aperture 274 through which the plurality of seaweed sheets 900 may be introduced into the sheet feeder 210. The sheet aperture 274 may be covered by a sheet lid 276 when not placing the plurality of seaweed sheets 900 into the sheet feeder 210. The aquarium-mount enclosure 270 may comprise a plurality of cube compartment apertures 278 through which the frozen fish food cubes 910 may be introduced into the plurality of compartments 232 of the frozen cube feeder 230. Each of the plurality of cube compartment apertures 278 may be covered by a compartment cap 280 when not placing the frozen fish food cubes 910 into the plurality of compartments 232.

In use, a plurality of seaweed sheets 900 may be loaded into the sheet feeder 210 through the sheet aperture 274 after removing the sheet lid 276, frozen fish food cubes 910 may be loaded into the plurality of compartments 232 of the frozen cube feeder 230 through the plurality of cube compartment apertures 278 after removing the compartment caps 280, and the sheet lid 276 and the compartment caps 280 may be replaced. The controller 250 may dispense the individual seaweed sheets 902 and the individual frozen fish food cubes 911 according to the predetermined schedule. The plurality of seaweed sheets 900 may be dispensed one at a time by energizing the motor 212 to rotate the roller 216. The frozen fish food cubes 910 may be dispensed one at a time by activating the door latch 238 on an individual compartment 234 to release the individual frozen fish food cube 911 and by pumping the aquarium water 930 onto the individual frozen fish food cube 911 to that the individual frozen fish food cube 911 before washing the individual frozen fish food cube 911 into the aquarium 920.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "AC" may be an acronym for alternating current.

As used in this disclosure, an "aperture" may be an opening in a surface or object. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used in this disclosure, "DC" may be an acronym for direct current.

As used in this disclosure, a "hinge" may be a device that permits the turning, rotating, or pivoting of a first object relative to a second object.

As used in this disclosure, a "lid" may be a movable or removable cover that is placed on a hollow structure to contain and/or protect the contents within the hollow structure.

As used in this disclosure, a "motor" may refer to a device that transforms energy from an external power source into mechanical energy.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure a "pulley" may be a wheel with a grooved rim around which a cord (or other form of rope, line, belt, or cable) passes. The pulley may be used to change the direction of a force applied to the cord. In some embodiments, pulleys may be used in groups of two or more to convey a force from one pulley to all other pulleys in the group via a belt. In some embodiments, a pair of opposing pulleys may be used to guide a cord along a path.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

As used in this disclosure, a "roller" may be a revolving cylindrical device which is used to move an object.

As used herein, "thermally insulated/thermally insulating" may refer to a property of a material that reduces the transfer of heat through the material. "Thermal insulation" may refer to a material having the property of being thermally insulating.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An automated fish-feeding device comprising:
a feeder mechanism and a controller;
wherein the automated fish-feeding device is adapted to dispense fish food to fish in an aquarium in the absence of a user;
wherein the feeder mechanism dispenses a plurality of seaweed sheets, frozen fish food cubes, or both in accordance with a predetermined schedule;
wherein the feeder mechanism comprises a refrigeration unit for chilling the frozen fish food cubes and a pump to thaw an individual frozen fish food cube using aquarium water before dispensing the individual frozen fish food cube;
wherein the automated fish-feeding device is packaged in an aquarium-mount enclosure that hangs on the side of the aquarium;
wherein the frozen fish food cubes are stored in a plurality of compartments before being dispensed;
wherein an individual compartment selected from the plurality of compartments stores one of the individual frozen fish food cubes;

wherein the individual frozen fish food cube released from the individual compartment lands on a cube ramp;
wherein the controller pumps the aquarium water onto the cube ramp to thaw the individual frozen fish food cube;
wherein once thawed, the individual frozen fish food cube slides down the cube ramp and into the aquarium;
wherein the feeder mechanism comprises a sheet feeder and a frozen cube feeder;
wherein the feeder mechanism is suspended above the aquarium water;
wherein the sheet feeder and the frozen cube feeder are side-by-side within the feeder mechanism;
wherein the sheet feeder stores a supply comprising the plurality of seaweed sheets;
wherein an individual seaweed sheet is drawn from the bottom of the supply by a roller when the roller is activated;
wherein the roller is activated by energizing a motor;
wherein the motor is coupled to a motor pulley and the roller is coupled to a roller pulley;
wherein a belt couples the motor pulley to the roller pulley such that energizing the motor causes rotation of the roller;
wherein the motor converts electrical energy into mechanical energy;
wherein the motor causes rotation of the motor pulley when the electrical energy is applied to the motor;
wherein the electrical energy applied to the motor is controlled by the controller;
wherein the sheet feeder comprises a sheet ramp which directs the plurality of seaweed sheets to the roller.

2. The automated fish-feeding device according to claim 1
wherein the frozen cube feeder dispenses the frozen fish food cubes one at a time.

3. The automated fish-feeding device according to claim 2
wherein the individual compartment comprises a trap door at the bottom of the individual compartment;
wherein the trap door is held closed by a door latch;
wherein the door latch is electromechanical and is energized by the controller to release the trap door;
wherein upon being released by the door latch, a spring within a hinge of the trap door forces the trap door to open, releasing the individual frozen fish food cube from the individual compartment.

4. The automated fish-feeding device according to claim 3
wherein the pump moves the aquarium water from a suction hose to a water outlet tube;
wherein the pump is electromechanical and comprises an internal motor that is energized by the application of an electrical potential to the pump.

5. The automated fish-feeding device according to claim 4
wherein the pump moves the aquarium water by applying rotary motion, reciprocating motion, linear motion, or a combination thereof to one or more gears, screws, pistons, shuttle blocks, vanes, diaphragms, plungers, chains, ropes, impellers, or combinations thereof;
wherein the electrical potential is applied to the motor by the controller;
wherein the suction hose extends down from the pump into the aquarium water;
wherein the water outlet tube is positioned to dispense the aquarium water onto the cube ramp.

6. The automated fish-feeding device according to claim 5
wherein the frozen cube feeder comprises the refrigeration unit to prevent the frozen fish food cubes from thawing prior to being dispensed onto the cube ramp;
wherein the refrigeration unit provides cooled air into the plurality of compartments;
wherein all or part of the aquarium-mount enclosure is thermally insulated to increases the effectiveness of the refrigeration unit.

7. The automated fish-feeding device according to claim 6
wherein the controller is suspended adjacent to the feeder mechanism outside of the aquarium;
wherein the controller monitors and controls the operation of the sheet feeder, the frozen cube feeder, and the refrigeration unit;
wherein the controller comprises a microprocessor, a power conditioning circuit, and a battery.

8. The automated fish-feeding device according to claim 7
wherein the microprocessor is a computer processor that incorporates the functions of a central processing unit in the form of one or more integrated circuits;
wherein the microprocessor monitors the sheet feeder, the frozen cube feeder, and the refrigeration unit by acquiring binary data through one or more input ports, processes the binary data according to instructions stored in memory contained within the microprocessor, and alters the state of one or more output signals to control the sheet feeder, the frozen cube feeder, and the refrigeration unit.

9. The automated fish-feeding device according to claim 8
wherein the microprocessor activates the sheet feeder to dispense the individual seaweed sheet and/or activate the frozen cube feeder to dispense and thaw the individual frozen fish food cube according to the predetermined schedule stored within the memory of the microprocessor.

10. The automated fish-feeding device according to claim 9
wherein the microprocessor establishes an operating temperature for the refrigeration unit to maintain within the plurality of compartments.

11. The automated fish-feeding device according to claim 10
wherein the power conditioning circuit accepts AC power supplied via an AC power cord and reduces, rectifies, filters, or otherwise electrically alters the AC power to produce a DC voltage for charging the battery;
wherein the battery assures that the sheet feeder, the frozen cube feeder, and the refrigeration unit remain operable during a power failure.

12. The automated fish-feeding device according to claim 11
wherein the battery comprises one or more energy-storage devices;
wherein the battery is a source of electrical energy to operate the microprocessor, the motor, the refrigeration unit, the door latches;
wherein the battery is rechargeable and/or replaceable.

13. The automated fish-feeding device according to claim 12
wherein the aquarium-mount enclosure houses the feeder mechanism and the controller;

wherein a bridge located between the feeder mechanism and the controller is operable to rest on the side of the aquarium such that the automated fish-feeding device is mountable on the aquarium;

wherein wiring between the controller and the feeder mechanism passes through the bridge;

wherein the aquarium-mount enclosure comprises a sheet aperture through which the plurality of seaweed sheets are introduced into the sheet feeder;

wherein the sheet aperture is covered by a sheet lid when the plurality of seaweed sheets are not being placed into the sheet feeder;

wherein the aquarium-mount enclosure comprises a plurality of cube compartment apertures through which the frozen fish food cubes are introduced into the plurality of compartments of the frozen cube feeder;

wherein each of the plurality of cube compartment apertures are covered by a compartment cap when the frozen fish food cubes are not being placed into the plurality of compartments.

* * * * *